C. MOLIN.
VEHICLE FENDER.
APPLICATION FILED JAN. 27, 1909.
952,207.
Patented Mar. 15, 1910.
3 SHEETS—SHEET 1.
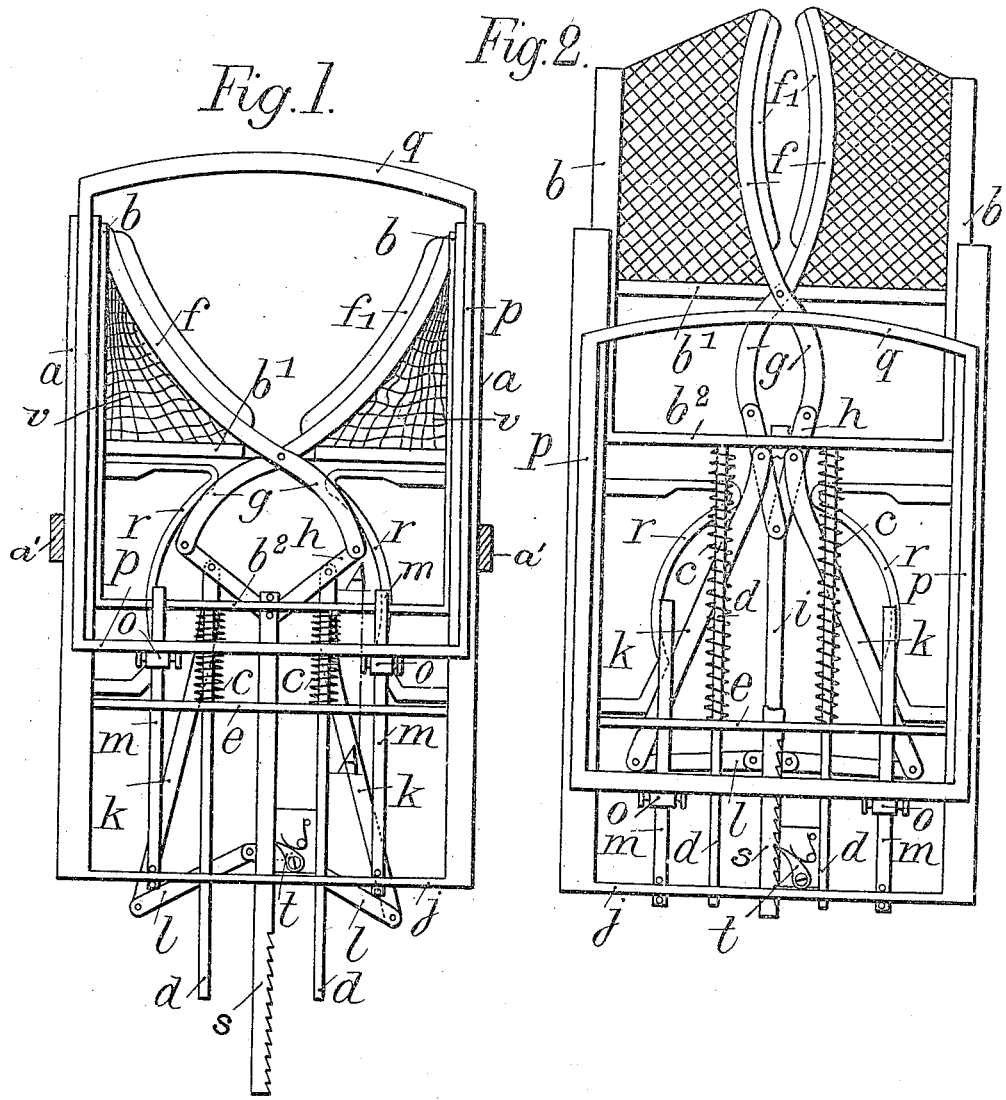
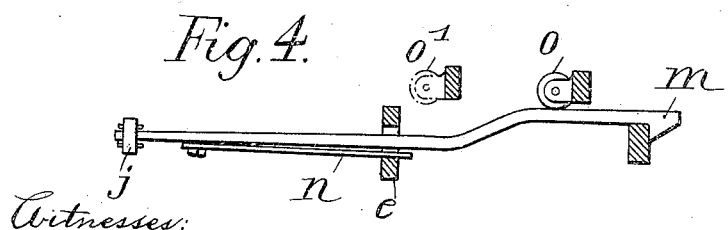

C. MOLIN.
VEHICLE FENDER.
APPLICATION FILED JAN. 27, 1909.

952,207.

Patented Mar. 15, 1910.
3 SHEETS—SHEET 2.

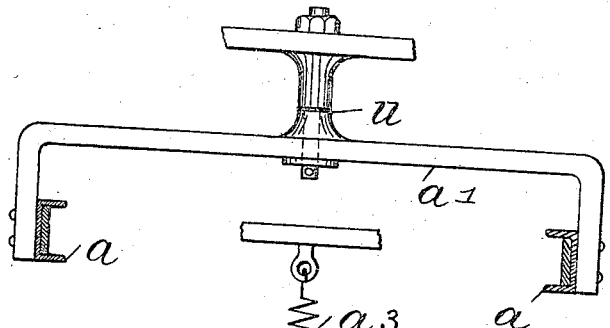
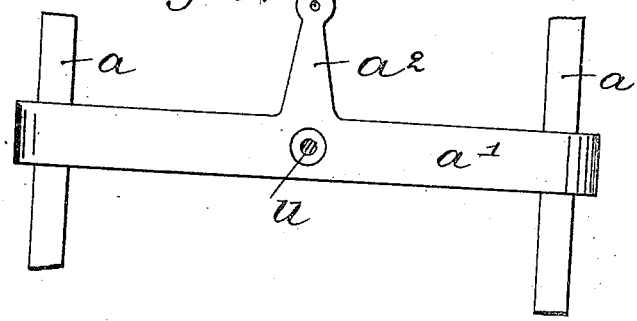

UNITED STATES PATENT OFFICE.

CHRISTIAAN MOLIN, OF AMSTERDAM, NETHERLANDS, ASSIGNOR TO SIMÉON SALOMON WEŸL, OF AMSTERDAM, NETHERLANDS.

VEHICLE-FENDER.

952,207. Specification of Letters Patent. Patented Mar. 15, 1910.

Application filed January 27, 1909. Serial No. 474,487.

*To all whom it may concern:*

Be it known that I, CHRISTIAAN MOLIN, of 22 Jan Hansenstraat, Amsterdam, Netherlands, engineer, have invented a new and useful Improvement in Vehicle-Fenders, which improvement is fully set forth in the following specification.

This invention has for its object an arrangement for preventing human beings or animals from being run over by vehicles of all kinds (tramcars, motor cars, etc.)

The arrangement consists of a pair of opened jaws situated beneath the front portion of the vehicle and capable, when released by a transverse stop bar, of being projected forward and closed by the action of suitable mechanism. The jaws by their forward and closing movement expand a pair of nets secured to the jaws and the arms of a frame moving with the jaws, and a person struck by the stop bar is seized by the jaws and caused to fall into the nets.

In order to reduce the shock of the impact of the apparatus it is provided at suitable points with pneumatic or other coverings and it preferably moves bodily around a vertical axis. The jaws can thus automatically set themselves in the best position for seizing the person. The vehicle is provided with suitable steering arrangements. For example, in motor car, the apparatus may be mounted on the stud axles in order to follow the steering movements. The driver therefore is provided with means for seizing, with the jaws, a person who would otherwise be run over by the wheels of the vehicle. The jaws and the frame carrying the nets may through the intermediary of the transverse stop bar be released in any suitable manner. Compressed air may be employed for effecting this and this medium may also serve to produce the forward movement of the jaws.

It is well to provide the apparatus with an arrangement for preventing any exterior forces from moving the jaws rearward and opening them when once closed. This may for example be effected by means of a rack and guides acting directly or indirectly upon the jaws; the guides may serve at the same time to produce the normal closing of the jaws.

Figure 3:
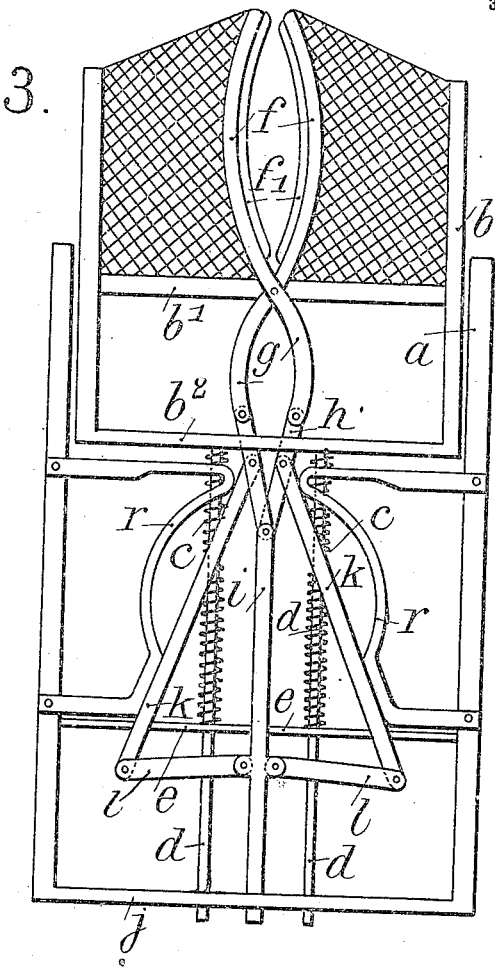
Figure 5:
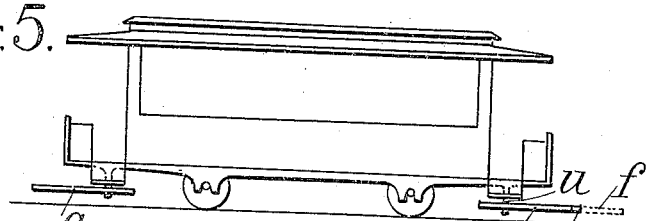
Figure 6:
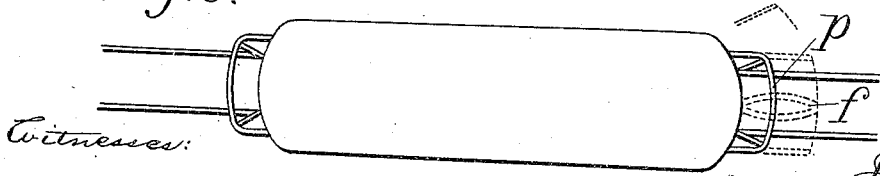

In the accompanying illustrative drawings, Figure 1 is a plan of a car fender embodying my invention arranged beneath a vehicle and ready for use. Fig. 2 shows the same after it has acted. Fig. 3 is a bottom plan view, a certain number of parts being removed. Fig. 4 is a section on a larger scale on the line A A of Fig. 1 which shows the method by which the apparatus is released. Fig. 5 is a diagrammatic elevation indicating the method of mounting the apparatus upon a tramcar. Fig. 6 is a plan of Fig. 5 in which the movement of the apparatus in different directions is indicated. Figs. 7 and 8 are fragmentary detail views showing in elevation and in plan respectively the mounting of the fender frame.

As shown in the drawing the apparatus consists of a rigid frame $a$ on which is mounted a sliding frame comprising two arms $b$ and two cross bars $b^1$, $b^2$. Upon the cross bar $b^2$ act springs $c$ guided by rods $d$ and which abut against a cross bar $e$ on the frame $a$ and which constitute yielding means for thrusting the jaws forward.

$f$ are jaws, pivoted upon the cross bar $b^1$ as shown in Figs. 1, 2 and 3 and provided with a pneumatic covering $f^1$ along the inner faces and each carrying a net $v$, one edge of which is secured along the outer faces, two other edges of the said net being fixed to the arm $b$ and to the cross bar $b^1$. The portions $g$ of the jaws are connected by links $h$ to a rod $i$ which is guided in the cross bars $b^2$ and the cross bar $j$ of the fixed frame $a$. Two rods or links $k$ connect the links $h$ to the links $l$ pivoted to the rod $i$. The cross bar $b^2$ is held in its normal position by hook bars $m$ which the springs $n$ tend to raise and which are kept down by rollers $o$ carried on a locking and tripping frame $p$; the frame $p$ moves upon the frame $a$ and is provided with a cross bar $q$, which forms a tripping buffer. The portion of the hooks $m$ on which the rollers $o$ normally rest are at a higher level than the other portion so that when the locking-frame $p$ has moved backward until the rollers $o$ are at $o^1$ (Fig. 4) the hooks rise and liberate the cross bar $b^2$. The frame $p$ with its roller $o$ thus constitutes a means for locking the pivoted jaws $f$ in their retracted and open position, while the bar $q$, when striking an obstacle, constitutes the means for releasing the jaws, said jaws being urged forward by the springs *c* and closed by the action of the guides *r* acting on the heads of the links *k*. The closing of the jaws is assured by cam guides *r* fixed to the sides of the frame *a* and against which the heads of the links *k* bear. When the jaws are thrust outward the links are wedged between the guides and thus prevent the jaws from being again opened by exterior forces. In order further to prevent the whole arrangement from being pushed backward a rack *s* is fixed to the cross-bar $b^2$, a pawl *t* engaging with the rack.

The apparatus is mounted as shown in Figs. 5, 7 and 8 upon a pivot *u* situated beneath the front portion of the vehicle and at a small distance from the ground; the cross bar *q* is a slight distance in front of the vehicle.

As will be seen from Figs. 7 and 8, the frame *a* is mounted on a yoke *a'* which yoke can oscillate around the pivot *u* forming a part of the body of the vehicle. The yoke is provided with an arm $a^2$ pointing in the direction of travel of the vehicle, which arm is connected to the vehicle body by a spring $a^3$. This spring tends to yieldingly maintain the yoke *a'* in line with the vehicle, but permits of the oscillation of the same when an obstacle is struck. Springs tend to maintain the apparatus axial with the vehicle.

The apparatus being ready for use as shown in Fig. 1 if a body is struck by the cross bar *q*, the frame *p* moves rearward, until its rollers *o* cease to rest upon the hooks *m*, the frame carrying the jaws is then projected forward by the springs *c*. In this movement the heads of the links *k* meet the guides *r* and force the links *h* and consequently the parts *g* to close which in their turn cause the jaws *f* to close upon the body which has struck the bar *q* causing the body to fall into the nets which are spread out by the closing of the jaws.

In order to reset the apparatus, it is only necessary to raise the pawl *t*, in order to move the frame which carries the jaws rearward and to pull forward the release cross bar or tripping buffer *q*.

Having now particularly described and ascertained the nature of my said invention and in what manner the same is to be performed, I declare that what I claim is:

1. In a vehicle-fender, a pair of pivotally connected jaws, longitudinally movable with respect to the vehicle, in combination with a releasing bar, and means for closing and throwing the jaws forward when the releasing bar strikes an obstacle.

2. A vehicle fender consisting of a pair of jaws, having nets secured to them and to two lateral bars which move forward at the same time as the jaws, substantially as described.

3. In a vehicle fender, a pair of pivoted jaws arranged to move longitudinally with respect to the vehicle, in combination with cam guides and parts connected with the jaws adapted to be engaged by the cam guides, whereby in the forward movement of the jaws the guides cause the jaws to close.

4. In a vehicle-fender, a pair of pivoted jaws arranged to move longitudinally with respect to the vehicle, in combination with cam guides and parts connected with the jaws adapted to be engaged by the cam guides, and means for locking the jaws in their closed position.

5. In a vehicle-fender, a pair of gripping jaws having nets attached thereto, in combination with means for releasing the jaws and causing them to close when the said means impinge against an obstacle.

6. In a vehicle-fender, a pair of pivoted gripping jaws provided with nets, means for locking the jaws in an open position, and a slidable bar arranged to liberate the jaws and cause them to close when the bar strikes an obstacle.

7. In a vehicle-fender, a pair of longitudinally movable and pivoted gripping jaws, means for opening said jaws when in a retracted position and closing them when in a forward position, a bar connected to and slidable with said jaws, and means for locking said bar when it and the jaws are in a forward position.

8. In a vehicle-fender, a pair of longitudinally movable and pivoted gripping jaws, means for opening said jaws when in a retracted position and closing them when in a forward position, a rack bar connected to and slidable with said jaws, and a pawl for engaging said rack-bar and preventing its return to a retracted position.

9. In a vehicle-fender, a frame pivotally mounted beneath the vehicle and capable of swinging in a horizontal plane, in combination with a pair of longitudinally movable jaws mounted in said frame, means for locking said jaws in their retracted position, means for urging them forward when released, and means for releasing them from their locked position when said releasing means encounters an obstacle.

10. In a vehicle-fender, a frame pivotally mounted beneath the vehicle and capable of swinging in a horizontal plane, in combination with a pair of longitudinally movable jaws, carrying nets mounted in said frame, means for locking said jaws in their retracted position, means for urging them forward when released, and means for releasing them from their locked position when said releasing means encounters an obstacle.

11. In a vehicle-fender, a frame pivotally mounted beneath the vehicle and capable of swinging in a horizontal plane, in combination with a pair of longitudinally movable pivoted jaws mounted in said frame, means for locking said jaws in their retracted position, means for urging them forward when released, and means for releasing them from their locked position when said releasing means encounters an obstacle.

In testimony whereof I have signed this specification in the presence of two subscribing witnesses.

CHRISTIAAN MOLIN.

Witnesses:
 H. C. COXE,
 FREDERIC HARLÉ.